(12) United States Patent
Yoshihara

(10) Patent No.: US 7,430,247 B2
(45) Date of Patent: Sep. 30, 2008

(54) CARRIER FREQUENCY DETECTION FOR N-ARY PHASE MODULATED SIGNAL

(75) Inventor: Koichi Yoshihara, Kajino-cho (JP)

(73) Assignee: Tektronix, Inc., Beaverton, OR (US)

( * ) Notice: Subject to any disclaimer, the term of this patent is extended or adjusted under 35 U.S.C. 154(b) by 620 days.

(21) Appl. No.: 11/036,650

(22) Filed: Jan. 13, 2005

(65) Prior Publication Data
US 2005/0164668 A1 Jul. 28, 2005

(30) Foreign Application Priority Data
Jan. 22, 2004 (JP) ............... 2004-014996

(51) Int. Cl.
*H04L 27/10* (2006.01)

(52) U.S. Cl. ............ 375/279; 375/329; 375/339; 375/371; 455/202; 455/203; 455/214; 455/216; 455/334; 329/306; 329/346

(58) Field of Classification Search .......... 375/261, 375/279, 324, 326, 327, 329, 339, 354, 371, 375/373, 376; 455/202, 203, 205, 209, 214, 455/216, 315, 316, 323, 334; 329/304, 306–308, 329/345, 346
See application file for complete search history.

(56) References Cited

U.S. PATENT DOCUMENTS

| | | | |
|---|---|---|---|
| 4,912,422 A * | 3/1990 | Kobayashi et al. | 329/306 |
| 5,077,531 A * | 12/1991 | Takeuchi et al. | 329/304 |
| 5,598,439 A | 1/1997 | Wagner | |
| 6,452,376 B1 * | 9/2002 | Marguinaud et al. | 324/76.21 |
| 6,810,097 B1 | 10/2004 | Yamagata | |
| 7,266,162 B2 * | 9/2007 | Jiang | 375/326 |

* cited by examiner

*Primary Examiner*—Dac V Ha
(74) *Attorney, Agent, or Firm*—Francis I. Gray (57) ABSTRACT

Carrier frequency detection for an N-ary modulated signal is achieved by digitizing the N-ary modulated signal, frequency shifting the digitized N-ary modulated signal to prevent aliasing, raising the frequency-shifted signal to the $N^{th}$ power, transforming the raised signal to frequency domain data and determining an initial maximum frequency peak, iteratively fine shifting the frequency of the N-ary modulated signal around the initial maximum frequency peak and repeating the raising, transforming and determining steps to obtain a plurality of maximum frequency peaks, and calculating the carrier frequency from the maximum frequency peaks and the total related frequency shift.

4 Claims, 7 Drawing Sheets

CARRIER FREQUENCY DETECTION FOR N-ARY PHASE MODULATED SIGNAL

BACKGROUND OF THE INVENTION

The present invention relates to telecommunications, and more particularly to carrier frequency detection for an N-ary phase modulated signal.

Figure 1:
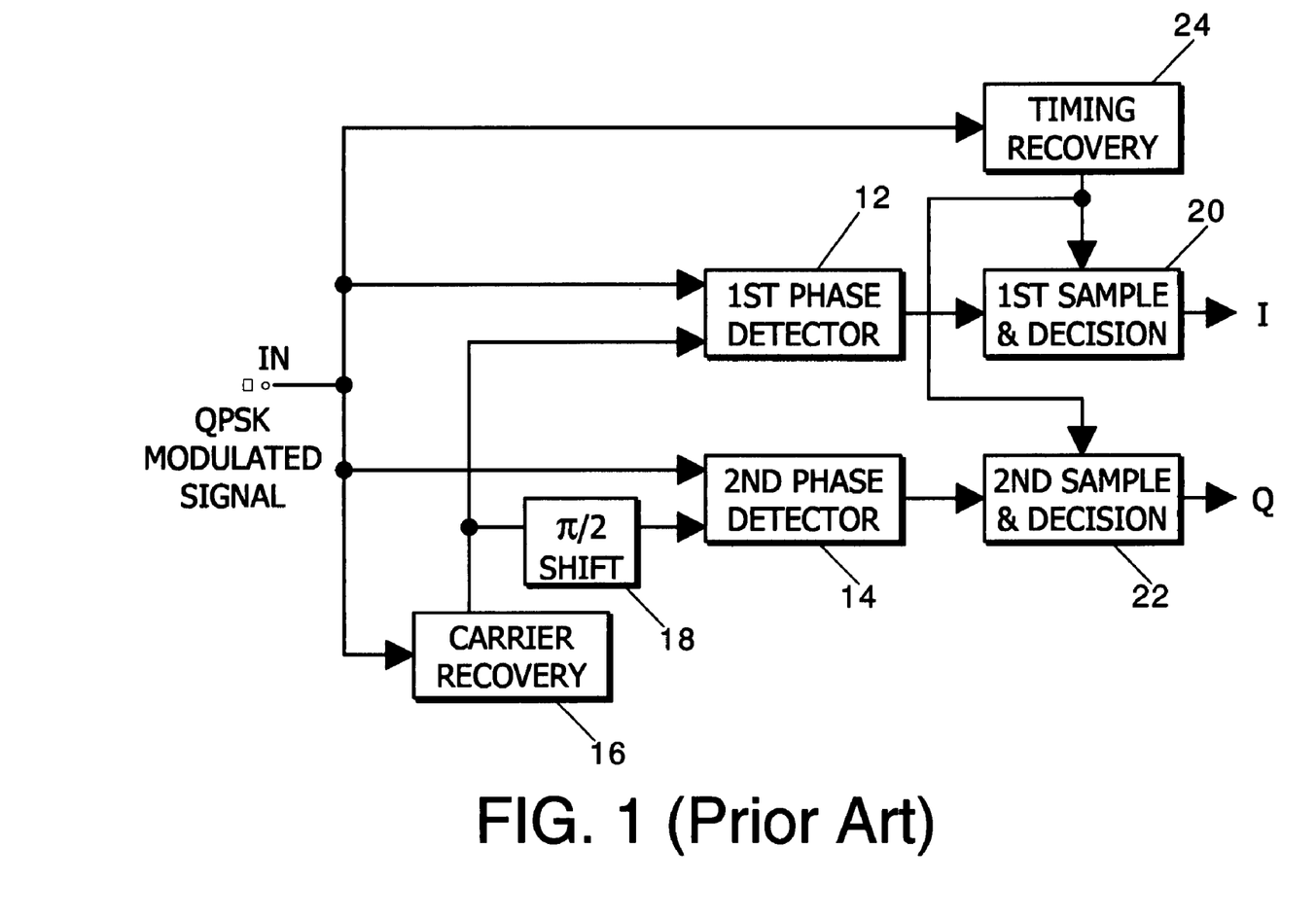
FIG. 1 is a block diagram view of a demodulator for a QPSK modulated signal according to the prior art.

Wireless communication by mobile phone is shifting from analog modulation to digital modulation. For example, a transmitter digitally modulates a baseband signal onto a carrier frequency and a receiver demodulates the modulated signal to obtain the baseband signal. FIG. 1 shows a block diagram of a typical demodulator for a QPSK (Quadrature Phase Shift Keying) modulated signal. The QPSK modulated signal is provided to first and second phase detectors 12, 14 and to a carrier recovery circuit 16. The carrier recovery circuit 16 recovers the carrier frequency from the QPSK modulated signal, and the carrier frequency is provided to the first phase detector 12. The second phase detector 14 receives the carrier frequency via a quadrature phase shifter 18. The outputs of the first and second phase detectors 12, 14 are provided to respective first and second sample and decision circuits 20, 22 to demodulate In-phase and Quadrature-phase (IQ) components for the baseband signal according to a timing signal from a timing recovery circuit 24.

Figure 2:
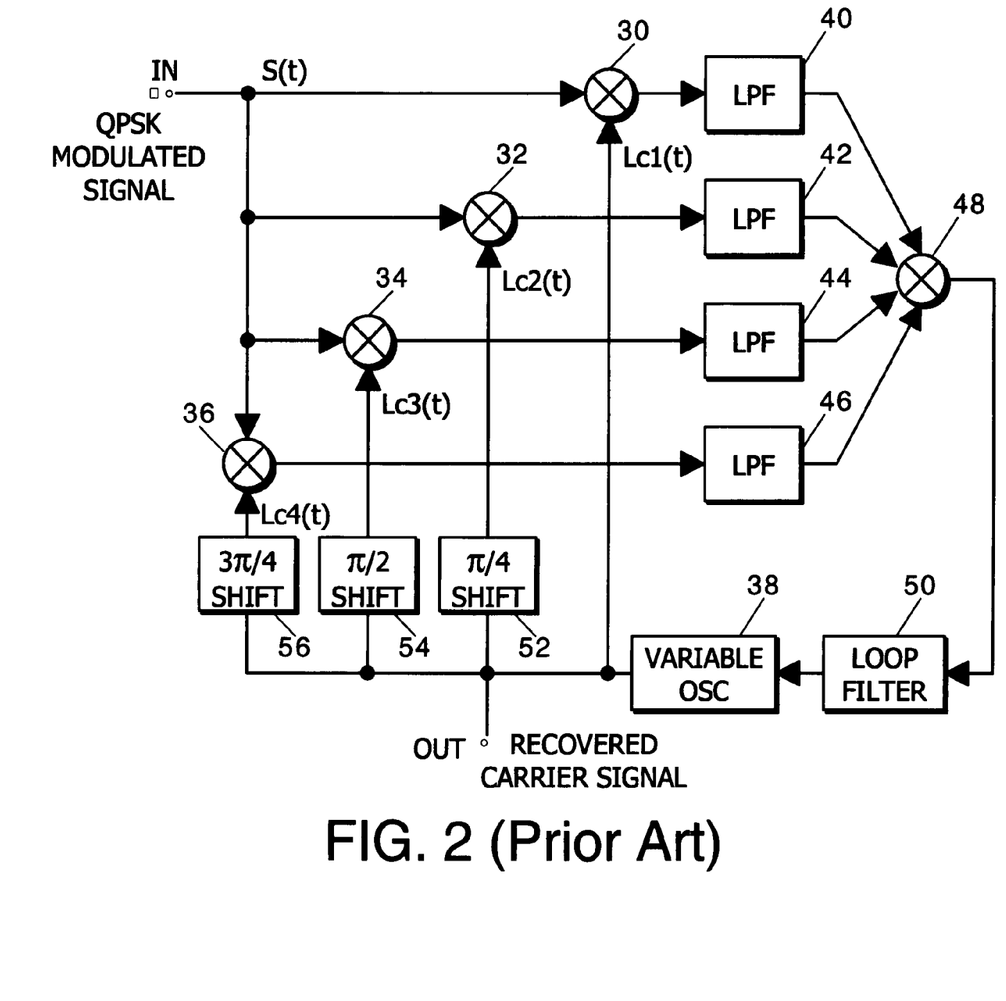
FIG. 2 is a block diagram view of a conventional carrier signal recovery circuit using a Costas loop according to the prior art.

The carrier recovery circuit 16 typically uses a Costas loop, which is a type of phase-locked loop, to recover the carrier frequency from the QPSK modulated signal. FIG. 2 shows a typical Costas loop that recovers the carrier frequency from a QPSK modulated signal. The QPSK modulated signal is provided to multipliers 30, 32, 34, 36 for multiplication by frequency signals derived from a variable frequency oscillator 38. The frequency signals provided to the multipliers 32, 34, 36 are shifted by $\pi/4$, $\pi/2$ and $3\pi/4$ respectively, relative to the frequency input to multiplier 30 from the variable frequency oscillator, through respective phase shifters 52, 54, 56. The outputs from the multipliers 30, 32, 34, 36 pass through respective low pass filters 40, 42, 44, 46 to remove the carrier frequency component. An output multiplier 48 multiplies the outputs from the four LPFs 40, 42, 44, 46 together to produce a signal raised to the $4^{th}$ power. Since the output from the output multiplier 48 is a fourth powered one relative to the original frequency of the QPSK modulated signal, the phase modulated components are converted into phase 0, $2\pi$, $4\pi$ and $6\pi$ components, i.e., all phase 0 components, and disappear so that the output signal depends upon a phase difference $\Delta\phi$ between the carrier frequency and the frequency signal from the variable frequency oscillator 38. The phase difference $\Delta\phi$ is provided to the variable frequency oscillator 38 via a loop filter 50. The output from the loop filter 50 controls the frequency of the variable frequency oscillator 38 to minimize the output from the output multiplier 48. If this control makes the phase difference $\Delta\phi=0$, the frequency signal from the variable frequency oscillator 38 is the carrier frequency. FIGS. 1 and 2 show a demodulator for a QPSK modulated signal having four phases, but a demodulator for an N-PSK modulated signal would be similar.

Alternatively, the block diagram of FIGS. 1 and 2 may be implemented in software using a computer. In this case, the QPSK modulated signal is digitized by analog-to-digital conversion using a sampling frequency before the demodulation process. If it is not required to demodulate the QPSK modulated signal in real time, such as where signal analysis involves iterative processes, the digitized QPSK modulated signal may be stored in a storage device, such as a hard disk drive, and the stored digitized QPSK modulated signal may be read out subsequently to conduct the demodulation process shown in FIGS. 1 and 2. If the process speed is fast enough, the software demodulation process may be performed in real time.

Carrier frequency recovery using a Costas loop is disclosed in U.S. Pat. No. 6,810,097 which has a loop filter circuit that includes a feedback loop with lower noise to provide fast and accurate recovery of the carrier frequency. The modulated signal is squared, i.e., multiplied by itself. A weak point of the Costas loop is that the feedback loop easily oscillates if the feedback loop is unstable. The feedback loop disclosed in the patent uses a complex circuit to produce the fast and accurate carrier frequency recovery. These are significant problems that even the software demodulation process or the ideal operations of the functional blocks may not get around.

What is desired is carrier frequency detection in a telecommunications demodulator that recovers the carrier frequency from an N-ary modulated signal while avoiding the use of potentially unstable and complex feedback loop processes.

BRIEF SUMMARY OF THE INVENTION

Accordingly the present invention provides carrier frequency detection for an N-ary phase modulated signal that does not use a potentially unstable and complex feedback loop while providing fast and accurate recovery of the carrier frequency in a telecommunications demodulator. First, the N-ary phase modulated signal is digitized to produce a digitized phase modulated signal, i.e., the N-ary phase modulated signal is converted by analog-to-digital conversion using a sampling frequency. Second, the digitized phase modulated signal is raised to an $N^{th}$ power signal using only multiplication without a feedback loop. To prevent aliasing caused by raising the digitized phase modulated signal to the $N^{th}$ power, a center frequency of the N-ary phase modulated signal may be shifted, but is kept lower than $1/(2N)$ of the sampling frequency. Third, the $N^{th}$ power signal is converted into frequency domain data. Fourth, a crest frequency is determined from the frequency domain data from which the carrier frequency is derived, i.e., the crest frequency is a frequency indicating a true peak derived from the frequency domain data. If there is no frequency shift of the digitized phase modulated signal, then the crest frequency is the carrier frequency. Otherwise the frequency shift amount in the center frequency prior to the raising to the $N^{th}$ power is subtracted from the crest frequency to arrive at the carrier frequency.

If the frequency domain conversion process is done using very high resolution, i.e., very narrow frequency bandwidth per frequency bin, it produces a large number of frequency domain data so that one of the frequency domain data may exactly correspond to the crest frequency. However, rarely does the frequency domain data include data exactly corresponding to the crest frequency because of the resolution, i.e., the frequency bandwidth per frequency bin. Therefore, one of the frequency domain data close to the crest frequency is first determined as the maximum frequency peak, and from the one frequency domain data a crest evaluation value is determined. The center frequency of the N-ary phase modulated signal is iteratively shifted to a plurality of frequencies about the frequency represented by the maximum frequency peak by fine frequency adjustments. For each iteration the N-ary modulated signal is raised to the $N^{th}$ power. The Nth power signals are converted to frequency domain data. A ratio of the power of a peak frequency domain data to a power average of the frequency domain data is calculated in each iterative process as the crest evaluation value, and a maximum crest evaluation value is found from all the crest evaluation values such that the frequency corresponding to the maximum crest evaluation value is the true peak frequency, or the crest frequency. Thus the true peak frequency is found precisely even if it is located between two of the frequency domain data obtained initially. The carrier frequency is derived from the crest frequency and the total of the frequency shifts corresponding to the maximum crest evaluation value.

The objects, advantages and other novel features of the present invention are apparent from the following detailed description when read in conjunction with the appended claims and attached drawing.

DETAILED DESCRIPTION OF THE INVENTION

A quadrature phase shift keying signal (QPSK) process is used for ease of describing the present invention, but the same process may be used for N-PSK, or N-ary, phase modulated signals, such as BPSK (Binary Phase Shift Keying), Offset-QPSK (OQPSK), etc. Any apparatus practicing the present invention may have a microprocessor, hard disk drive, keyboard, etc., as is well known in the art, and the hard disk drive may store a program for implementing the present invention.

Figure 3:
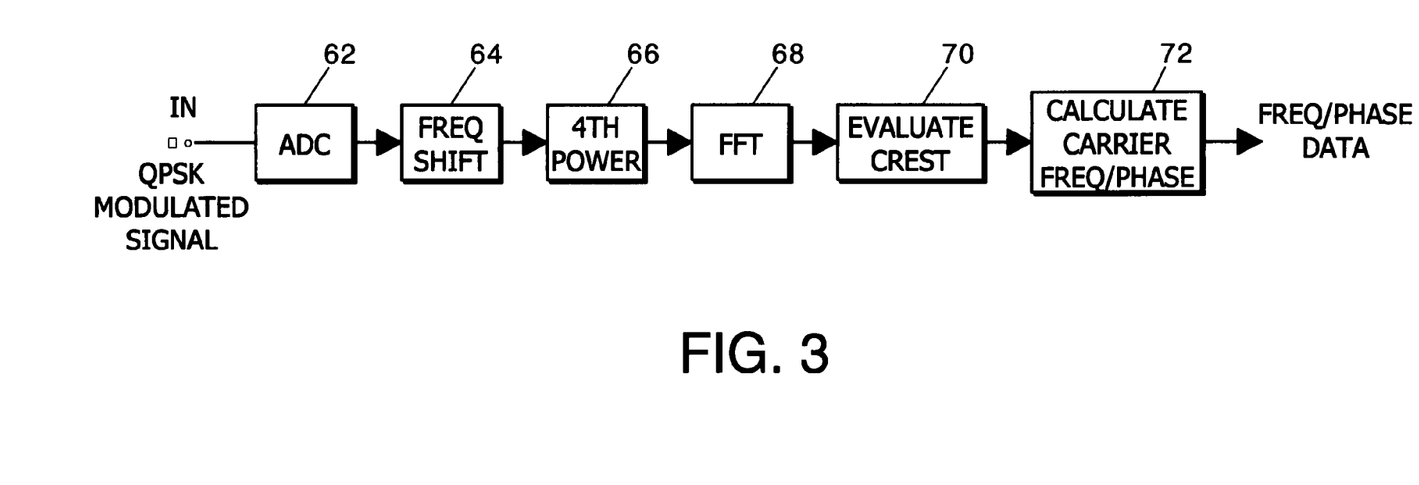
FIG. 3 is a functional block diagram view for carrier frequency detection according to the present invention.
Figure 4:
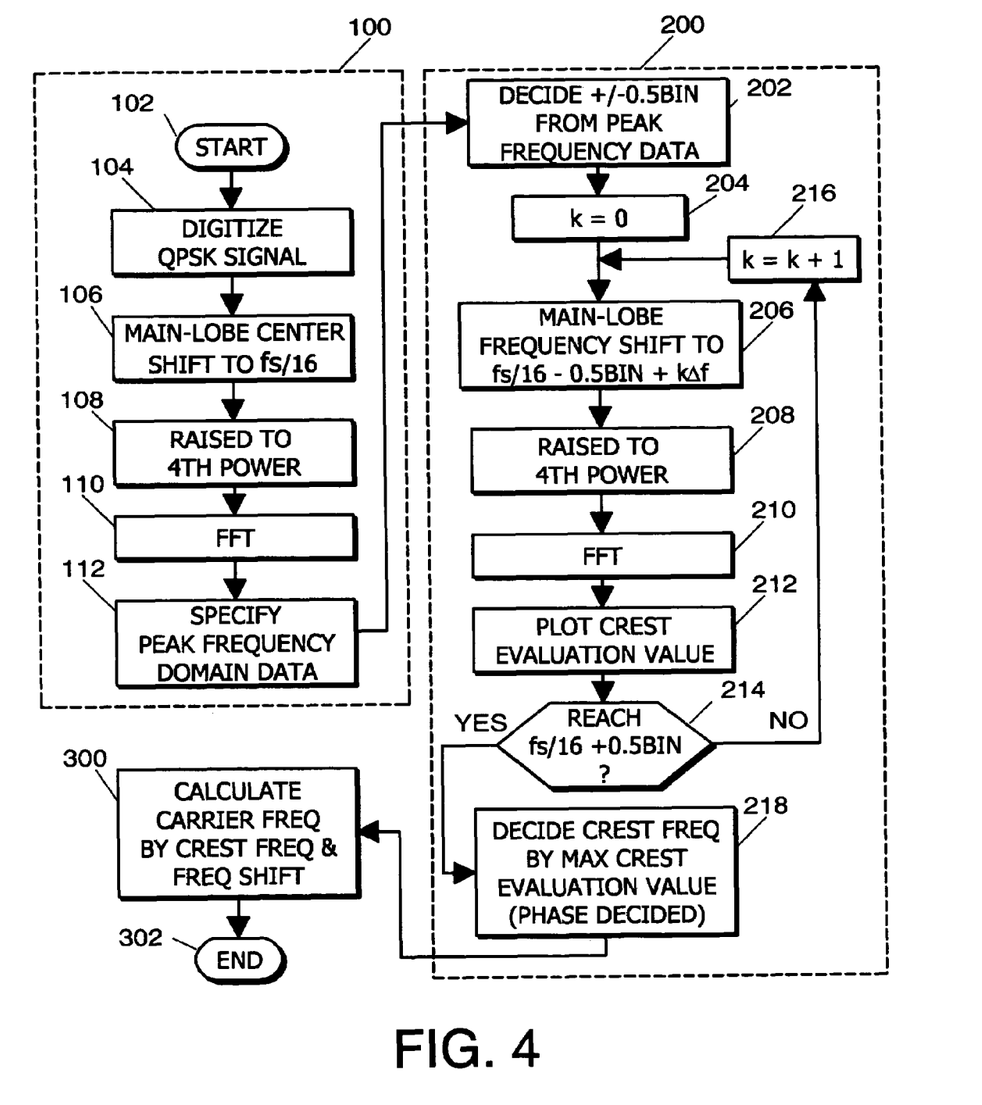
FIG. 4 is a flowchart view for carrier frequency detection according to the present invention.
Figure 5:
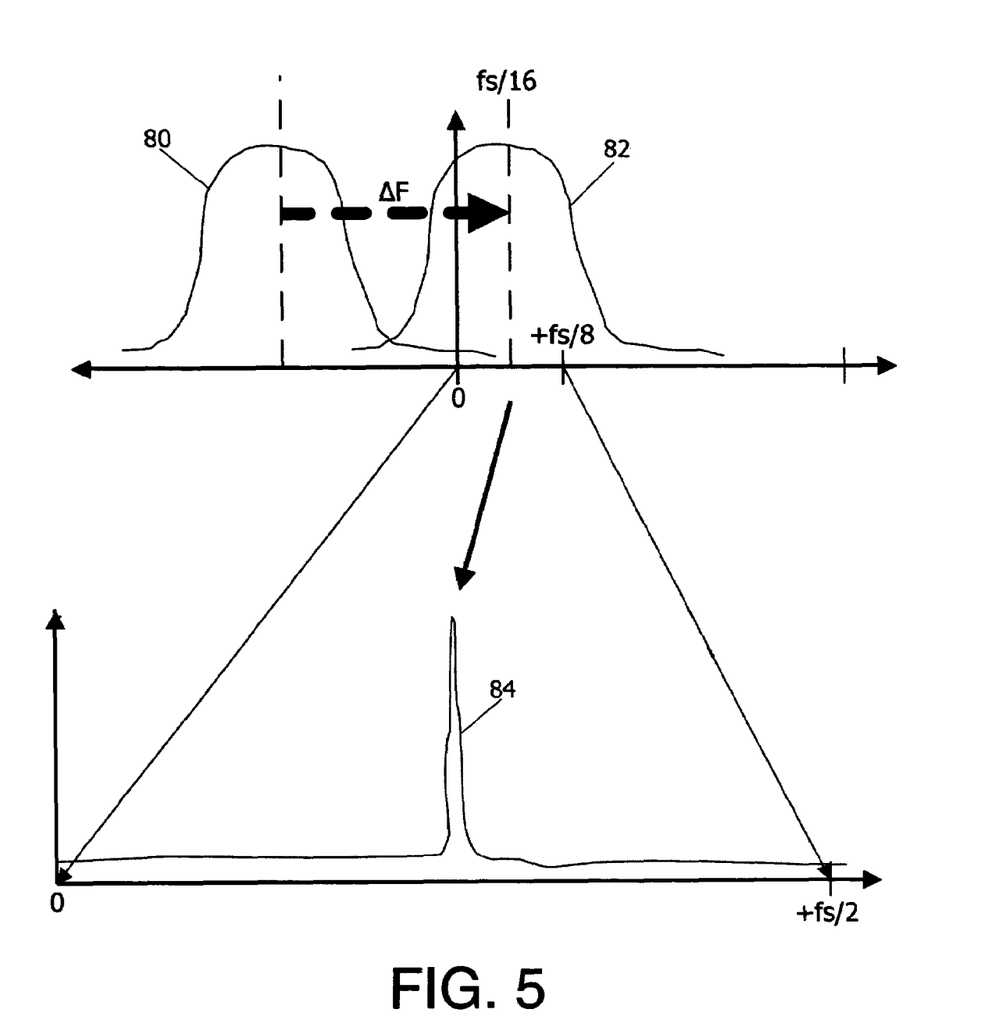
FIG. 5 is a graphic view illustrating a frequency shift according to the present invention.

Referring now to FIGS. 3 and 4, from a start point (step 102) of an initial evaluation process 100 an analog-to-digital converter (ADC) 62 digitizes a QPSK phase modulated signal in response to a sampling frequency, $f_s$, to produce a digitized QPSK phase modulated signal (step 104). The digitized QPSK phase modulated signal may be stored in the hard disk drive mentioned above. The digitized QPSK phase modulated signal is shifted in a frequency shifter 64 by a known frequency amount before raising it to the fourth ($N^{th}$) power to prevent aliasing of a carrier frequency component (step 106). FIG. 5 illustrates in the frequency domain the shifting of the frequency of the digitized QPSK phase modulated signal. The carrier frequency component is approximately equal to a center frequency, the center of a main-lobe 80 of the QPSK phase modulated signal, so that the fourth power of the center frequency is limited to be no more than 1/(2N) the frequency of the sampling frequency. Specifically in this embodiment where N=4 the center frequency is no more than $f_s/8$. In the illustration of FIG. 5 the center frequency is shifted to $f_s/16$, which is enough smaller than $f_s/8$ to provide a margin. The main-lobe 80 is the original QPSK phase modulated signal and the main-lobe 82 is the frequency-shifted QPSK phase modulated signal. The amount of the frequency shift, ΔF, is stored. The frequency-shifted QPSK phase modulated signal is raised to the fourth power by conventional methods. However, a low pass filter and feedback loop, such as in a Costas loop, are not used, so only a fourth power process is performed (step 108). This emphasizes only the center frequency component corresponding to the carrier frequency component, and a waveform 84 occurs as shown in FIG. 5. The fourth power signal is transformed to the frequency domain, such as by a fast Fourier transform (FFT) process 66 (step 110), to produce frequency domain data. From the frequency domain data a peak value is identified (step 112).

Figure 6:
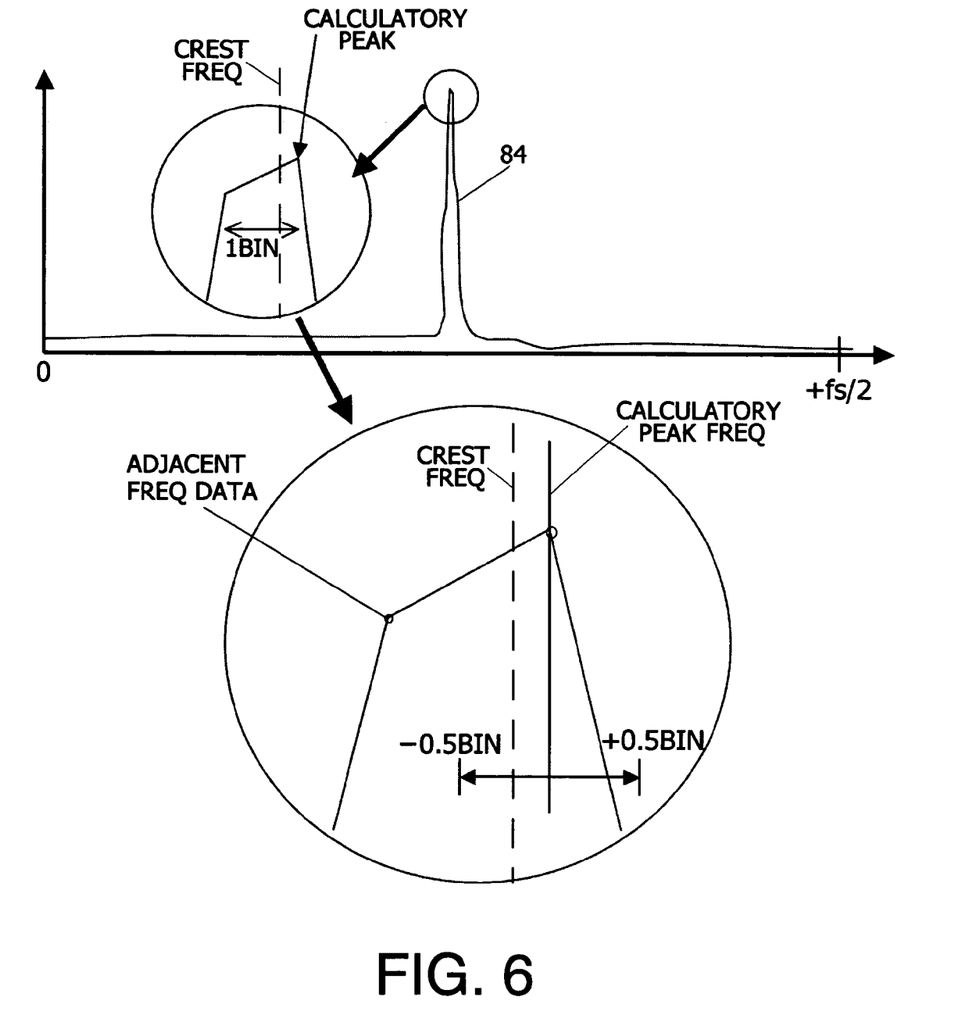
FIG. 6 is a graphic view illustrating how to find a crest frequency according to the present invention.
Figure 7:
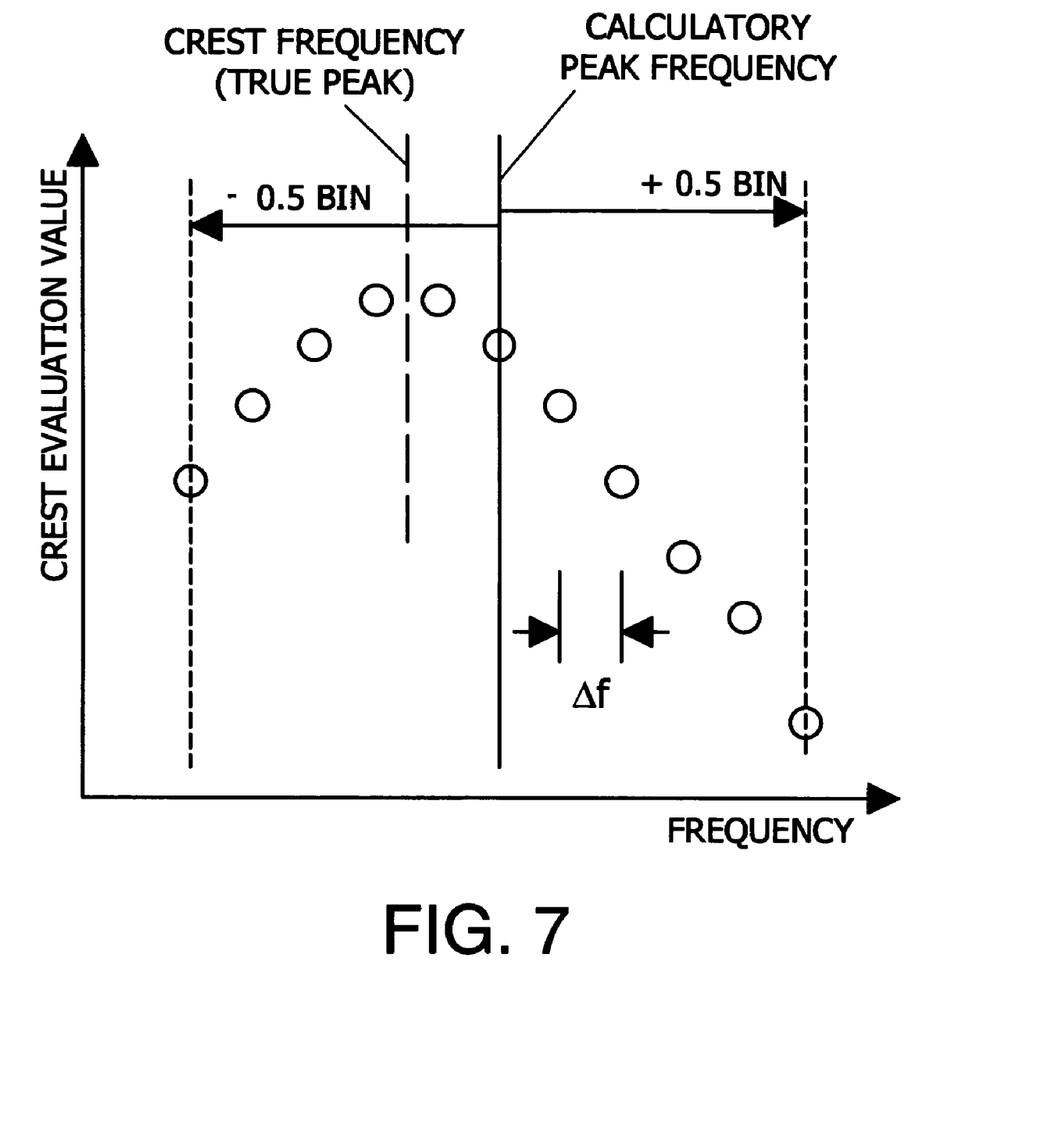
FIG. 7 is a graphic view of crest frequency evaluation values according to the present invention.

Ideally, only one of the frequency domain data exactly corresponding to the shifted carrier frequency component of the frequency-shifted QPSK phase modulated signal has the peak value significantly larger than the other frequency domain data, which are very small. But this is a very rare case because of the resolution of the frequency domain data, i.e., each frequency domain data represents a range of frequencies—the narrower the frequency range the greater the resolution and vice versa. Therefore, a frequency corresponding to the true frequency peak needs to be determined using the frequency domain data. The frequency corresponding to the true peak is a "crest" frequency. Referring to FIG. 6, which is an extended graph around the top of the waveform 84, the crest frequency is located between frequencies represented by a maximum frequency peak and an adjacent frequency domain data. An evaluation process 70 for determining the crest frequency corresponding to the true peak is represented by the steps surrounded by a dotted square 200 in FIG. 4. At the first step (step 202) from the frequency domain data indicating the peak in the steps 100 a range of +/−0.5 bin is determined—a bin defines the frequency resolution of the frequency domain conversion, i.e., frequency range per bin. Then, the frequency-shifted QPSK phase modulated signal is iteratively shifted (steps 204, 214, 216) by a finer frequency increment, Δf, of the frequency shifter 64 (step 206), raised to the fourth power 66 (step 208), and FFT processed 68 (step 210) to evaluate 70 the peak power value for each iteration. In addition to the peak power value evaluated from the steps 206-210, an average power for the frequency domain data is calculated. Then a ratio of the peak power value to the average power is calculated as a crest evaluation value (step 212). A sum of the powers of the frequency domain data may be used for the average power. If the center frequency of the frequency-shifted QPSK phase modulated signal is getting closer to the ideal, the power of the peak value is getting larger and the powers of the other frequency domain data are getting smaller. Plotting (step 212) the crest evaluation values for each iterative process from the steps 206-210 indicates a maximum frequency, and the maximum frequency is the crest frequency (step 218). FIG. 7 shows an example of plotting the crest evaluation values. Further, finer frequency iterative shifting and crest evaluation may be done, if necessary.

The frequency shifting may be done by computation. A signal of frequency F is expressed by the following complex equation according to Euler's Formula:

$$e^{j2\pi Ft} = \cos 2\pi Ft + j \sin 2\pi Ft$$

To provide a frequency shift of Δf the above equation is multiplied by $e^{j2\pi\Delta ft}$:

$$e^{j2\pi Ft}e^{j2\pi\Delta ft} = e^{j2\pi(F+\Delta f)t} = \cos 2\pi(F+\Delta f)t + j\sin 2\pi(F+\Delta f)t$$

This frequency shifting process may be done in either software or by hardware down conversion, but the hardware implementation may not be practical for very small frequency shifts.

When the crest frequency is found, a carrier frequency is derived 72 from the total frequency shift (ΔF in steps 100 and $k\Delta f$ to the maximum crest evaluation value in steps 200) and the crest frequency (step 300). The process ends at step 302. A phase of the carrier frequency is evaluated at the same time because the FFT process produces frequency domain data that have IQ components which determine the phase, but it is not described here in detail. The above-described embodiment handles a QPSK phase modulated signal having four phases so that $4^{th}$ power is used. If it is an N-ary phase modulated signal, $N^{th}$ power may be used.

Thus carrier frequency detection determines a carrier frequency of an N-ary phase modulated signal without a feedback loop and without a complex process by raising the N-ary phase modulated signal, shifted by an initial frequency value to prevent aliasing, to the $N^{th}$ power, converting the raised power signal to the frequency domain, finding a peak in the frequency domain data as an estimated crest frequency, iteratively fine frequency shifting the initially frequency-shifted N-ary phase modulation signal about the estimated crest frequency and repeating the raising, converting and finding steps, and from the plurality of estimated crest frequencies and the total frequency shift corresponding to a maximum of the estimated crest frequencies deriving the carrier frequency.

What is claimed is:

1. A method of detecting a carrier frequency for an N-ary phase modulated signal comprising the steps of:

digitizing the N-ary phase modulated signal at a sampling frequency;

raising the N-ary phase modulated signal to the $N^{th}$ power to produce a raised power signal;

transforming the raised power signal into frequency domain data;

evaluating a crest frequency from the frequency domain data, wherein evaluating comprises iteratively fine shifting the center frequency of the N-ary phase modulated signal to a plurality of frequencies around a peak value in the frequency domain data;

for each iteration repeating the raising and transforming steps to obtain a plurality of peak values;

for each iteration calculating a ratio of peak value to average power for the frequency domain data;

finding a maximum ratio from all the iterations; and evaluating a frequency corresponding to the maximum ratio as the crest frequency; and calculating the carrier frequency from the crest frequency.

2. The method as recited in claim 1 wherein the calculating step comprises the step of taking into account a total frequency shift corresponding to the maximum ratio to calculate the carrier frequency from the crest frequency.

3. An apparatus for detecting a carrier frequency of an N-ary phase modulated signal comprising:

means for digitizing the N-ary phase modulated signal at a sampling frequency prior to input to the raising means;

means for raising the N-ary phase modulated signal to an Nth power to produce a raised power signal;

means for transforming the raised power signal into frequency domain data;

means for evaluating a crest frequency from the frequency domain data comprising;

means for iteratively fine shifting the center frequency of the N-ary phase modulated signal to a plurality of frequencies around a peak value in the frequency domain data such that the fine-frequency-shifted N-ary phase modulated signal is processed by the raising and transforming means to produce new frequency domain data for each iteration;

means for calculating for each iteration a ratio of peak value to average power for the frequency domain data;

means for finding a maximum ratio from the ratios for all the iterations; and means for evaluating a frequency corresponding to the maximum ratio as the crest frequency; and means for calculating the carrier frequency from the crest frequency.

4. The apparatus as recited in claim 3 wherein the calculating means comprised means for taking into account a total frequency shift corresponding to the maximum ratio to calculate the carrier frequency from the crest frequency.

* * * * *